United States Patent
Hartman et al.

(10) Patent No.: US 11,375,453 B2
(45) Date of Patent: Jun. 28, 2022

(54) POWER-EFFICIENT COMMUNICATION OF GROUP-ADDRESSED FRAMES

(71) Applicant: Apple Inc., Cupertino, CA (US)

(72) Inventors: Christiaan A. Hartman, San Jose, CA (US); Guoqing Li, Cupertino, CA (US); Yong Liu, Campbell, CA (US); Su Khiong Yong, Palo Alto, CA (US); Jarkko L. Kneckt, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/113,659

(22) Filed: Aug. 27, 2018

(65) Prior Publication Data

US 2019/0200295 A1    Jun. 27, 2019

Related U.S. Application Data

(60) Provisional application No. 62/609,213, filed on Dec. 21, 2017.

(51) Int. Cl.
*H04W 52/02* (2009.01)
*H04W 84/12* (2009.01)

(52) U.S. Cl.
CPC ... *H04W 52/0229* (2013.01); *H04W 52/0219* (2013.01); *H04W 52/0222* (2013.01); *H04W 52/0235* (2013.01); *H04W 84/12* (2013.01)

(58) Field of Classification Search
CPC ......... H04W 52/0229; H04W 52/0219; H04W 52/0222; H04W 84/12; H04W 52/0235;
(Continued)

(56) References Cited

U.S. PATENT DOCUMENTS 6,973,052 B2   12/2005   Wang
7,457,973 B2   11/2008   Liu
(Continued)

FOREIGN PATENT DOCUMENTS

CN    103210600 A    7/2013
CN    104270803 A    1/2015
(Continued)

OTHER PUBLICATIONS

Extended European Search Report, European Patent Application No. 18206052.5, dated Apr. 10, 2019, eight pages.
(Continued)

*Primary Examiner* — Hardikkumar D Patel
(74) *Attorney, Agent, or Firm* — Kowert, Hood, Munyon, Rankin & Goetzel, P.C.

(57) ABSTRACT

An interface circuit in an electronic device (such as an access point) may receive a setup request associated with the recipient electronic device. The setup request may specify a group address for which the recipient electronic device wants to receive associated frames and a proposed transmission interval. Based at least in part on the proposed transmission interval, the electronic device may determine a transmission schedule and/or may assign, based at least in part on the group address, the recipient electronic device to an aggregated group having a flexible multicast service identifier (FMSID). Then, the electronic device may provide a wake-up frame for the recipient electronic device, where the wake-up frame includes an identifier of the aggregated group for which a group-addressed frame will subsequently be transmitted by the electronic device. Moreover, the wake-up frame may be provided at a transmission time based at least in part on the transmission schedule.

20 Claims, 9 Drawing Sheets

(58) Field of Classification Search
CPC . H04W 74/0833; H04W 4/008; H04W 76/11; H04W 74/006; H04W 68/005; H04W 48/12; H04W 74/02; H04W 74/085; H04W 28/0263; H04W 74/00; H04W 52/0248; H04W 16/14; H04W 92/10; Y02D 30/70; H04L 5/0007; H04L 27/2613

See application file for complete search history.

(56) References Cited

U.S. PATENT DOCUMENTS

| | | | |
|---|---|---|---|
| 7,477,616 | B2 | 1/2009 | Wang |
| 8,958,433 | B2 | 2/2015 | Kamath |
| 9,955,333 | B2 | 4/2018 | Benoit |
| 2009/0196212 | A1 | 8/2009 | Wentink |
| 2013/0155930 | A1 | 6/2013 | Chu |
| 2013/0195209 | A1 | 8/2013 | Sharma |
| 2014/0161010 | A1 | 6/2014 | Merlin |
| 2016/0105829 | A1 | 4/2016 | Wentink |
| 2016/0219512 | A1 | 7/2016 | Asterjadhi |
| 2017/0111853 | A1 | 4/2017 | Azizi et al. |
| 2017/0332327 | A1* | 11/2017 | Fang ............ H04L 5/0007 |
| 2018/0049131 | A1 | 2/2018 | Huang |
| 2018/0288703 | A1 | 10/2018 | Sun |
| 2018/0302923 | A1* | 10/2018 | Patil ............ H04W 74/0833 |
| 2018/0317172 | A1 | 11/2018 | Lepp |
| 2019/0159127 | A1 | 5/2019 | Son |

FOREIGN PATENT DOCUMENTS

| | | |
|---|---|---|
| CN | 107360619 A | 11/2017 |
| EP | 3 413 636 A1 | 12/2018 |
| WO | WO2018070820 A1 | 4/2018 |

OTHER PUBLICATIONS

European Exam Report for Patent Application No. 18206052.5; dated Oct. 16, 2020; 6 Pages.
First Office Action for CN Application No. 201811448173.4, dated May 31, 2021, 10 pages.

* cited by examiner

POWER-EFFICIENT COMMUNICATION OF GROUP-ADDRESSED FRAMES

CROSS-REFERENCE TO RELATED APPLICATION

This application claims the benefit of U.S. Provisional Application No. 62/609,213, entitled "Power-Efficient Communication of Group-Addressed Frames," by Christiaan A. Hartman, et al., filed Dec. 21, 2017, the contents of which are hereby incorporated by reference.

This application is related to U.S. Non-Provisional application Ser. No. 16/113,550, entitled "Wake-Up Radio with Urgent-Data Criteria," by Jarkko L. Kneckt, filed Aug. 27, 2018, the contents of which are hereby incorporated by reference.

FIELD

The described embodiments relate, generally, to wireless communications among electronic devices, and techniques for improving power efficiency by selectively receiving individually-addressed frames or group-addressed frames using a wake-up radio.

BACKGROUND

Many electronic devices communicate with each other using wireless local area networks (WLANs), such as those based on a communication protocol that is compatible with an IEEE 802.11 standard (which is sometimes referred to as 'Wi-Fi'). However, a radio in an electronic device that communicates using wireless communication in a WLAN may consume a significant amount of power.

In order to address this challenge, a new radio technology called Low Power Wake-Up Radio (LP-WUR) is being considered (in the discussion that follows a LP-WUR is referred to as a 'wake-up radio' or a WUR). The WUR may be a companion to the main Wi-Fi radio in the electronic device. Notably, by using the WUR, the electronic device may turn off its main radio and may selectively wake up the main radio in response to the WUR receiving a WUR packet from an access point. For example, the access point may send the WUR packet when there is a down-link packet for the electronic device.

Moreover, an access point typically transmits group-addressed frames after a Delivery Traffic Indication Message (DTIM) beacon. Consequently, a WUR in an electronic device usually wakes up the main radio after DTIM beacons to receive any group-addressed frames. However, these regular or periodic wake ups can significantly increase the power consumption of the electronic device. Indeed, the power consumption may be comparable to a legacy electronic device without a WUR that operates in a lower-power mode between DTIM beacons.

SUMMARY

A first group of embodiments relates to an electronic device that provides a wake-up frame. This electronic device may include a node that can be communicatively coupled to an antenna, and an interface circuit communicatively coupled to the node and that communicates with a recipient electronic device. During operation, the interface circuit receives, from the node, a WUR-setup request associated with the recipient electronic device, where the WUR-setup request specifies a group address for which the recipient electronic device wants to receive associated frames and a proposed transmission interval. Then, the interface circuit determines a transmission schedule based at least in part on the proposed transmission interval. Next, the interface circuit provides, to the node, the wake-up frame intended for the recipient electronic device, where the wake-up frame includes an identifier of an aggregated group that includes the group address for which a group-addressed frame will subsequently be transmitted by the electronic device, and the wake-up frame is provided at a transmission time based at least in part on the transmission schedule.

Note that the transmission time may be an integer multiple of a DTIM-beacon transmission interval, where the integer is greater than one.

Moreover, the identifier may include a Flexible Multicast Service identifier (FMSID).

Furthermore, the wake-up frame may specify an FMS stream for which there is pending traffic in the electronic device.

Additionally, the interface circuit may select an FMS stream for which there is pending traffic in the electronic device, and the wake-up frame may specify the FMS stream.

In some embodiments, the interface circuit may assign, based at least in part on the group address, the recipient electronic device to the aggregated group having a FMSID.

Note that the electronic device may include an access point.

Moreover, the WUR-setup request and the wake-up frame may be compatible with an IEEE 802.11 communication protocol.

Furthermore, the interface circuit may: receive, from the node, a second WUR-setup request associated with the recipient electronic device, where the second WUR-setup request specifies one or more attributes associated with group-addressed frames that the recipient electronic device wants to receive using a directed multicast service (DMS); and provide, to the node, a second wake-up frame intended for the recipient electronic device, where the second wake-up frame indicates that the electronic device will subsequently provide a unicast copy of a second group-addressed frame having the one or more attributes.

Other embodiments provide an interface circuit in the electronic device.

Other embodiments provide a computer-readable storage medium for use with the interface circuit in the electronic device. When program instructions stored in the computer-readable storage medium are executed by the interface circuit, the program instructions may cause the electronic device to perform at least some of the aforementioned operations of the electronic device.

Other embodiments provide a method for providing a wake-up frame. The method includes at least some of the aforementioned operations performed by the interface circuit in the electronic device.

A second group of embodiments relates to a recipient electronic device that receives a wake-up frame. This recipient electronic device may include a node that can be communicatively coupled to an antenna, and an interface circuit communicatively coupled to the node and that communicates with an electronic device. The interface circuit may include a main radio and a WUR that at least selectively transitions the main radio from a lower-power mode to a higher-power mode in response to the wake-up frame. During operation, the main radio in the recipient electronic device provides, to the node, a WUR-setup request intended for the electronic device, where the WUR-setup request specifies a group address for which the recipient electronic device wants to receive associated frames and a proposed transmission interval. Then, the WUR in the recipient electronic device receives, from the node, the wake-up frame associated with the electronic device, where the wake-up frame includes an identifier of an aggregated group that includes the group address for which a group-addressed frame will subsequently be transmitted by the electronic device, and the wake-up frame is received at a time corresponding to the proposed transmission interval.

Note that the transmission time may be an integer multiple of a DTIM-beacon transmission interval, where the integer is greater than one.

Moreover, the identifier may include an FMSID.

Furthermore, the electronic device may include an access point.

Additionally, the WUR-setup request and the wake-up frame may be compatible with an IEEE 802.11 communication protocol.

In some embodiments, based at least in part on the wake-up frame, the WUR may selectively transition the main radio in the recipient electronic device from a lower-power mode to a higher-power mode. Then, the main radio may receive the group-addressed frame.

Note that the wake-up frame may include a change indication that indicates FMS information has changed. In response to the change indication, the main radio may receive updated FMS information. Moreover, the updated FMS information may be received, from the node and using the main radio, in a DTIM beacon associated with the electronic device. Furthermore, the main radio may: provide, to the node, a probe request intended for the electronic device; and receive, from the node, a probe response associated with the electronic device, where the probe response includes the updated FMS information.

In some embodiments, the main radio may: provide, to the node, a second WUR-setup request intended for the electronic device, where the second WUR-setup request specifies one or more attributes associated with group-addressed frames that the recipient electronic device wants to receive using DMS; and receive, from the node, a second wake-up frame associated with the electronic device, where the second wake-up frame indicates that the electronic device will subsequently provide a unicast copy of a second group-addressed frame having the one or more attributes.

Other embodiments provide an interface circuit in the recipient electronic device.

Other embodiments provide a computer-readable storage medium for use with the interface circuit in the recipient electronic device. When program instructions stored in the computer-readable storage medium are executed by the interface circuit, the program instructions may cause the recipient electronic device to perform at least some of the aforementioned operations of the recipient electronic device.

Other embodiments provide a method for receiving a wake-up frame. The method includes at least some of the aforementioned operations performed by the interface circuit in the recipient electronic device.

A third group of embodiments relates to an electronic device that selectively provides a wake-up frame. This electronic device may include a node that can be communicatively coupled to an antenna, and an interface circuit communicatively coupled to the node and that communicates with a recipient electronic device. During operation, the interface circuit receives, from the node, a WUR-setup request associated with the recipient electronic device, where the WUR-setup request specifies one or more urgency criteria for downlink traffic from the electronic device for the recipient electronic device. Then, the interface circuit receives a frame addressed to the recipient electronic device. Moreover, the interface circuit determines a traffic urgency of the frame based at least in part on the one or more urgency criteria. Next, based at least in part on the determined traffic urgency, the interface circuit: selectively provide, to the node, the wake-up frame intended for the recipient electronic device, where the wake-up frame includes information specifying the traffic urgency of the frame; or stores the frame in a buffer.

Note that the one or more urgency criteria may include at least one of: an access category (AC), an Internet Protocol (IP) address, a User Datagram Protocol (UDP) port, or a quality-of-service (QoS).

Moreover, the interface circuit may provide, to the node, a second wake-up frame intended for the recipient electronic device at a subsequent retransmission time for the determined traffic urgency of the stored frame, where the second wake-up frame includes information specifying the traffic urgency of the frame.

Furthermore, the electronic device may include an access point.

Additionally, the WUR-setup request and the wake-up frame may be compatible with an IEEE 802.11 communication protocol.

Other embodiments provide an interface circuit in the electronic device.

Other embodiments provide a computer-readable storage medium for use with the interface circuit in the electronic device. When program instructions stored in the computer-readable storage medium are executed by the interface circuit, the program instructions may cause the electronic device to perform at least some of the aforementioned operations of the electronic device.

Other embodiments provide a method for selectively providing a wake-up frame. The method includes at least some of the aforementioned operations performed by the interface circuit in the electronic device.

A fourth group of embodiments relates to a recipient electronic device that receives a wake-up frame. This recipient electronic device may include a node that can be communicatively coupled to an antenna, and an interface circuit communicatively coupled to the node and that communicates with an electronic device. The interface circuit may include a main radio and a WUR that at least selectively transitions the main radio from a lower-power mode to a higher-power mode in response to the wake-up frame. During operation, the main radio in the recipient electronic device provides, to the node, a WUR-setup request intended for the electronic device, where the WUR-setup request specifies one or more urgency criteria for downlink traffic from the electronic device for the recipient electronic device. Then, the WUR in the recipient electronic device receives, from the node, the wake-up frame associated with the electronic device, where the wake-up frame includes information specifying a traffic urgency of a frame that the electronic device will transmit.

Note that the one or more urgency criteria may include at least one of: an AC, an IP address, a UDP port, or a QoS.

Moreover, the WUR may receive, at the node, a second wake-up frame associated with the electronic device, where the second wake-up frame includes information specifying a traffic urgency of the frame.

Furthermore, the electronic device may include an access point.

Additionally, the WUR-setup request and the wake-up frame may be compatible with an IEEE 802.11 communication protocol.

In some embodiments, the WUR may selectively transition the main radio from a lower-power mode to a higher-power mode based at least in part on the information. Then, the main radio may receive the frame.

Other embodiments provide an interface circuit in the recipient electronic device.

Other embodiments provide a computer-readable storage medium for use with the interface circuit in the recipient electronic device. When program instructions stored in the computer-readable storage medium are executed by the interface circuit, the program instructions may cause the recipient electronic device to perform at least some of the aforementioned operations of the recipient electronic device.

Other embodiments provide a method for receiving a wake-up frame. The method includes at least some of the aforementioned operations performed by the interface circuit in the recipient electronic device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Note that like reference numerals refer to corresponding parts throughout the drawings. Moreover, multiple instances of the same part are designated by a common prefix separated from an instance number by a dash.

DETAILED DESCRIPTION

Figure 1:
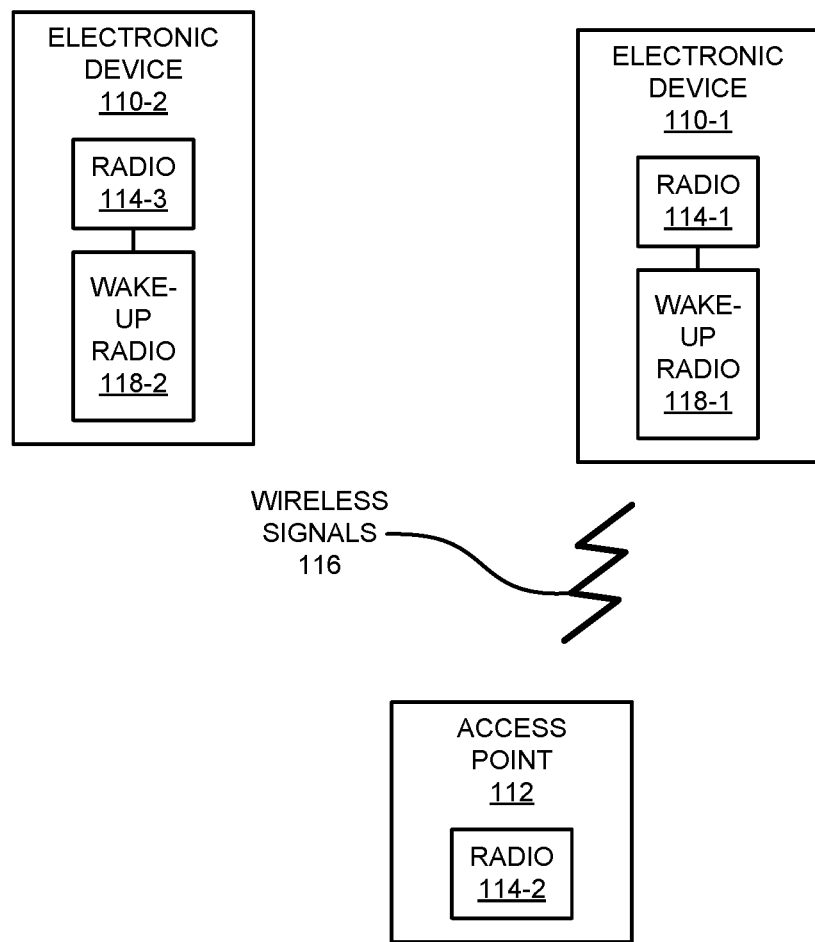
FIG. 1 is a block diagram illustrating an example of electronic devices communicating wirelessly.

An interface circuit in an electronic device (such as an access point) may receive a WUR-setup request associated with the recipient electronic device. The WUR-setup request may specify a group address for which the recipient electronic device wants to receive associated frames and a proposed transmission interval. Based at least in part on the proposed transmission interval, the electronic device may determine a transmission schedule and/or may assign, based at least in part on the group address, the recipient electronic device to an aggregated group having a FMSID. Then, the electronic device may provide a wake-up frame intended for the recipient electronic device, where the wake-up frame includes an identifier of the aggregated group for which a group-addressed frame will subsequently be transmitted by the electronic device. Moreover, the wake-up frame may be provided at a transmission time based at least in part on the transmission schedule.

By determining a transmission schedule for group-addressed frames, the communication techniques may allow the recipient electronic device to reduce the frequency that it wakes up the main radio. Consequently, the communication techniques may significantly decrease the power consumption of the recipient electronic device. Thus, the communication techniques may improve the user experience when using the electronic device or the recipient electronic device, and therefore may increase customer satisfaction and retention.

Note that the communication techniques may be used during wireless communication between electronic devices in accordance with a communication protocol, such as a communication protocol that is compatible with an IEEE 802.11 standard (which is sometimes referred to as Wi-Fi). In some embodiments, the communication techniques are used with IEEE 802.11BA and/or IEEE 802.11ax, which are used as illustrative examples in the discussion that follows. However, this communication techniques may also be used with a wide variety of other communication protocols, and in electronic devices (such as portable electronic devices or mobile devices) that can incorporate multiple different radio access technologies (RATs) to provide connections through different wireless networks that offer different services and/or capabilities.

An electronic device can include hardware and software to support a wireless personal area network (WPAN) according to a WPAN communication protocol, such as those standardized by the Bluetooth Special Interest Group (in Kirkland, Wash.) and/or those developed by Apple (in Cupertino, Calif.) that are referred to as an Apple Wireless Direct Link (AWDL). Moreover, the electronic device can communicate via: a wireless wide area network (WWAN), a wireless metro area network (WMAN), a WLAN, near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol. In some embodiments, the communication protocol includes a peer-to-peer communication technique.

The electronic device, in some embodiments, can also operate as part of a wireless communication system, which can include a set of client devices, which can also be referred to as stations or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an IEEE 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax, or other present or future developed IEEE 802.11 technologies.

In some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using Wi-Fi), and that provides access to another network (such as the Internet) via IEEE 802.3 (which is sometimes referred to as 'Ethernet'). However, in other embodiments the electronic device may not be an access point. As an illustrative example, in the discussion that follows the electronic device is or includes an access point.

Additionally, it should be understood that the electronic devices described herein may be configured as multi-mode wireless communication devices that are also capable of communicating via different 3G and/or second generation (2G) RATs. In these scenarios, a multi-mode electronic device or UE can be configured to prefer attachment to LTE networks offering faster data rate throughput, as compared to other 3G legacy networks offering lower data rate throughputs. For example, in some embodiments, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

FIG. 1 presents a block diagram illustrating an example of electronic devices communicating wirelessly. Notably, one or more electronic devices 110 (such as a smartphone, a laptop computer, a notebook computer, a tablet, or another such electronic device) and access point 112 may communicate wirelessly in a WLAN using an IEEE 802.11 communication protocol. Thus, electronic devices 110 may be associated with access point 112. For example, electronic devices 110 and access point 112 may wirelessly communicate while: detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). Note that access point 112 may provide access to a network, such as the Internet, via an Ethernet protocol, and may be a physical access point or a virtual or 'software' access point that is implemented on a computer or an electronic device. In the discussion that follows, electronic devices 110 are sometimes referred to as 'recipient electronic devices.'

As described further below with reference to FIG. 9, electronic devices 110 and access point 112 may include subsystems, such as a networking subsystem, a memory subsystem, and a processor subsystem. In addition, electronic devices 110 and access point 112 may include radios 114 in the networking subsystems. More generally, electronic devices 110 and access point 112 can include (or can be included within) any electronic devices with networking subsystems that enable electronic devices 110 and access point 112, respectively, to wirelessly communicate with another electronic device. This can include transmitting beacons on wireless channels to enable the electronic devices to make initial contact with or to detect each other, followed by exchanging subsequent data/management frames (such as connect requests) to establish a connection, configure security options (e.g., IPSec), transmit and receive packets or frames via the connection, etc.

As can be seen in FIG. 1, wireless signals 116 (represented by a jagged line) are communicated by radios 114-1 and 114-2 in electronic device 110-1 and access point 112, respectively. For example, as noted previously, electronic device 110-1 and access point 112 may exchange packets using a Wi-Fi communication protocol in a WLAN. As illustrated further below with reference to FIGS. 2-8, radio 114-1 may receive wireless signals 116 that are transmitted by radio 114-2. Alternatively, radio 114-1 may transmit wireless signals 116 that are received by radio 114-2. However, as described further below with reference to FIG. 5, radio 114-1 consumes additional power in a higher-power mode. If radio 114-1 remains in the higher-power mode even when it is not transmitting or receiving packets, the power consumption of electronic device 110-1 may be needlessly increased. Consequently, electronic devices 110 may include WURs 118 that listen for and/or receive wake-up frames (and/or other wake-up communications), e.g., from access point 112. When a particular electronic device (such as electronic device 110-1) receives a wake-up frame, WUR 118-1 may selectively wake-up radio 114-1, e.g., by providing a wake-up signal that selectively transitions radio 114-1 from a lower-power mode to the higher-power mode.

As discussed previously, the approach employed by some electronic devices to receive group-address frames can significantly reduce the power-saving advantages of WURs, such as WURs 118.

In order to address this challenge, as described further below with reference to FIGS. 2-4, access point 112 may receive a WUR-setup request from electronic device 110-1, where the WUR-setup request specifies a group address for which electronic device 110-1 wants to receive associated frames and a proposed transmission interval. Then, access point 112 may determine a transmission schedule based at least in part on the proposed transmission interval. Next, access point 112 may provide the wake-up frame to electronic device 110-1, where the wake-up frame includes an identifier (such as an FMSID) of an aggregated group that includes the group address for which a group-addressed frame will subsequently be transmitted by access point 112, and the wake-up frame is provided at a transmission time (which may be an integer multiple of a DTIM-beacon transmission interval) based at least in part on the transmission schedule. For example, the wake-up frame may specify an FMS stream for which there is pending traffic in access point 112. Based at least in part on the wake-up frame, WUR 118-1 may selectively transition radio 114-1 from a lower-power mode to a higher-power mode, and then access point 112 may provide the group-addressed frame to electronic device 110-1.

Note that the wake-up frame may include a change indication that indicates FMS information has changed. In response to the change indication, and after radio 114-1 has been awoken, electronic device 110-1 may provide updated FMS information to access point 112. For example, the updated FMS information may be provided in a DTIM beacon. In some embodiments, electronic device 110-1 may provide a probe request to access point 112. In response, access point 112 may provide a probe response to electronic device 110-1, where the probe response includes the updated FMS information.

Alternatively or additionally, access point 112 may receive a second WUR-setup request from electronic device 110-1, where the second WUR-setup request specifies one or more attributes associated with group-addressed frames that electronic device 110-1 wants to receive using DMS. Then, access point 112 may provide a second wake-up frame to electronic device 110-1, where the second wake-up frame indicates that access point 112 will subsequently provide a unicast copy of a second group-addressed frame having the one or more attributes.

In some embodiments, access point 112 may receive a WUR-setup request from electronic device 110-1, where the WUR-setup request specifies one or more urgency criteria for downlink traffic from access point 112 for electronic device 110-1. For example, the one or more urgency criteria may include at least one of: an AC (such as voice, video, best effort and/or background), an IP address, a UDP port, or a QoS. Then, access point 112 may receive a frame addressed to electronic device 110-1. Moreover, access point 112 may determine a traffic urgency of the frame based at least in part on the one or more urgency criteria. Next, based at least in part on the determined traffic urgency, access point 112 may selectively provide a wake-up frame to electronic device 110-1, where the wake-up frame includes information specifying the traffic urgency of the frame. Alternatively, access point 112 may store the frame in a buffer. Furthermore, access point 112 may provide a second wake-up frame to electronic device 110-1 at a subsequent retransmission time for the determined traffic urgency of the stored frame, where the second wake-up frame includes information specifying the traffic urgency of the frame.

In these ways, the communication techniques may allow electronic devices 110 and access point 112 to communicate efficiently (such as with fewer or less frequent wake-up packets or frames, and thus with reduced transmission overhead), while significantly reducing the power consumption associated with radios 114 and WURs 118 in electronic devices 110. These capabilities may improve the user experience when using electronic devices 110.

Note that access point 112 and at least some of electronic devices 110 may be compatible with an IEEE 802.11 standard that includes trigger-based channel access (such as IEEE 802.11ax). However, access point 112 and at least this subset of electronic devices 110 may also communicate with one or more legacy electronic devices that are not compatible with the IEEE 802.11 standard (i.e., that do not use multi-user trigger-based channel access). In some embodiments, at least a subset of electronic devices 110 use multi-user transmission (such as orthogonal frequency division multiple access or OFDMA). For example, radio 114-2 may provide a trigger frame intended for the subset of electronic devices 110. This trigger frame may be provided after a time delay (such as a time delay between, e.g., 10 and 300 ms), so that radio 114-1 has sufficient time to transition to the higher-power mode. Moreover, after radio 118-1 receives a wake-up frame or when there is a targeted-wake-up-time (TWT) service period (SP) and radio 114-1 transitions to the higher-power mode, radio 114-1 may provide a group acknowledgment to radio 114-2. For example, radio 114-1 may provide the acknowledgment during an assigned time slot and/or in an assigned channel in the group acknowledgment. However, in some embodiments the one or more electronic devices 110 may individually provide acknowledgments to radio 114-2. Thus, after radio 118-1 receives the wake-up frame and radio 114-1 transitions to the higher-power mode, radio 114-1 (and, more generally, the main radios in the one or more electronic devices 110) may provide an acknowledgment to radio 114-2.

In the described embodiments, processing a packet or frame in one of electronic devices 110 and access point 112 includes: receiving wireless signals 116 encoding a packet or a frame; decoding/extracting the packet or frame from received wireless signals 116 to acquire the packet or frame; and processing the packet or frame to determine information contained in the packet or frame (such as data in the payload).

In general, the communication via the WLAN in the communication techniques may be characterized by a variety of communication-performance metrics. For example, the communication-performance metric may include any/all of: an RSSI, a data rate, a data rate for successful communication (which is sometimes referred to as a 'throughput'), a latency, an error rate (such as a retry or resend rate), a mean-square error of equalized signals relative to an equalization target, inter-symbol interference, multipath interference, a signal-to-noise ratio (SNR), a width of an eye pattern, a ratio of a number of bytes successfully communicated during a time interval (such as a time interval between, e.g., 1 and 10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers and/or types of electronic devices may be present. For example, some embodiments may include more or fewer electronic devices. As another example, in other embodiments, different electronic devices can be transmitting and/or receiving packets or frames.

Figure 2:
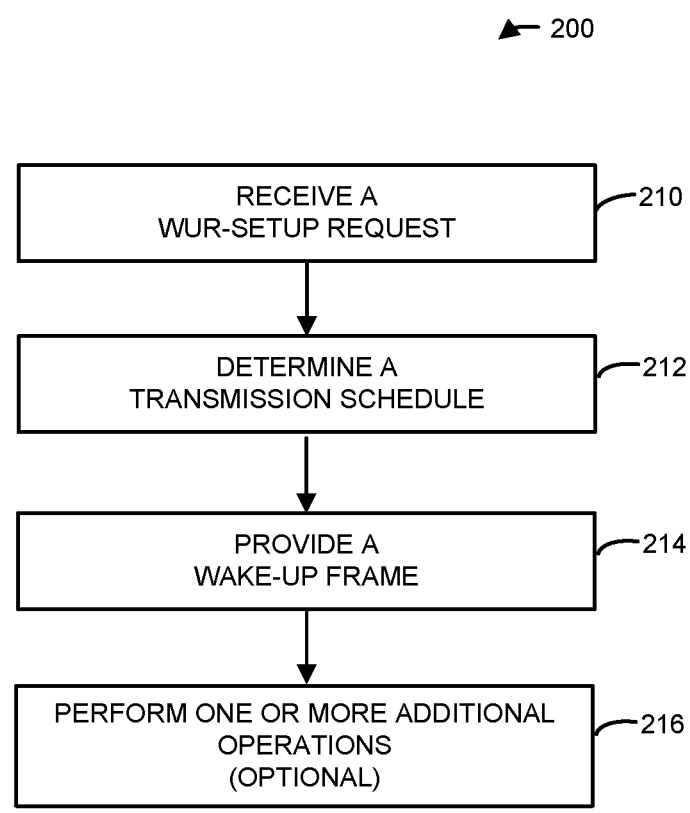
FIG. 2 is a flow diagram illustrating an example of a method for providing a wake-up frame using one of the electronic devices in FIG. 1.

FIG. 2 presents a flow diagram illustrating an example method 200 for providing a wake-up frame. This method may be performed by an electronic device, such as an interface circuit in access point 112 in FIG. 1. During operation, the interface circuit may receive a WUR-setup request (operation 210) associated with the recipient electronic device, where the WUR-setup request specifies a group address for which the recipient electronic device wants to receive associated frames and a proposed transmission interval.

Then, the interface circuit may determine a transmission schedule (operation 212) based at least in part on the proposed transmission interval.

Next, the interface circuit may provide the wake-up frame (operation 214) intended for the recipient electronic device, where the wake-up frame includes an identifier of an aggregated group that includes the group address for which a group-addressed frame will subsequently be transmitted by the electronic device, and the wake-up frame is provided at a transmission time based at least in part on the transmission schedule.

Note that the transmission time may be an integer multiple of a DTIM-beacon transmission interval, where the integer is greater than one. Moreover, the identifier may include a FMSID. Furthermore, the wake-up frame may specify an FMS stream for which there is pending traffic in the electronic device.

In some embodiments, the interface circuit optionally performs one or more additional operations (operation 216). For example, the interface circuit may select an FMS stream for which there is pending traffic in the electronic device, and the wake-up frame may specify the FMS stream. Moreover, the interface circuit may assign, based at least in part on the group address, the recipient electronic device to the aggregated group having a FMSID.

Furthermore, the interface circuit may receive a second WUR-setup request associated with the recipient electronic device, where the second WUR-setup request specifies one or more attributes associated with group-addressed frames that the recipient electronic device wants to receive using DMS. Then, the interface circuit may provide a second wake-up frame intended for the recipient electronic device, where the second wake-up frame indicates that the electronic device will subsequently provide a unicast copy of a second group-addressed frame having the one or more attributes.

Figure 3:
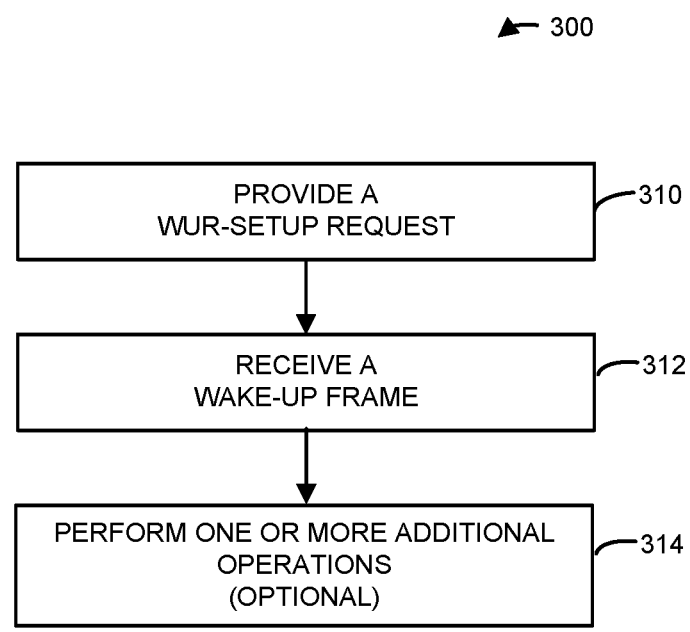
FIG. 3 is a flow diagram illustrating an example of a method for receiving a wake-up frame using one of the electronic devices in FIG. 1.

FIG. 3 presents a flow diagram illustrating an example method 300 for receiving a wake-up frame. This method may be performed by a recipient electronic device, such as an interface circuit in electronic device 110-1 in FIG. 1. This interface circuit may include a WUR and a main radio. During operation, the main radio in the recipient electronic device may provide a WUR-setup request (operation 310) intended for the electronic device, where the WUR-setup request specifies a group address for which the recipient electronic device wants to receive associated frames and a proposed transmission interval. Then, the WUR in the recipient electronic device may receive the wake-up frame (operation 312) associated with the electronic device, where the wake-up frame includes an identifier of an aggregated group that includes the group address for which a group-addressed frame will subsequently be transmitted by the electronic device, and the wake-up frame is received at a time corresponding to the proposed transmission interval.

Note that the transmission time may be an integer multiple of a DTIM-beacon transmission interval, where the integer is greater than one. Moreover, the identifier may include a FMSID.

In some embodiments, the recipient electronic device optionally performs one or more additional operations (operation 314). For example, based at least in part on the wake-up frame, the WUR in the recipient electronic device may selectively transition the main radio in the recipient electronic device from a lower-power mode to a higher-power mode. Then, the main radio in the recipient electronic device may receive the group-addressed frame.

Moreover, the wake-up frame may include a change indication that indicates FMS information has changed. In response to the change indication, the main radio may receive updated FMS information. Moreover, the updated FMS information may be received in a DTIM beacon associated with the electronic device. Furthermore, the main radio may: provide a probe request intended for the electronic device; and receive a probe response associated with the electronic device, where the probe response includes the updated FMS information.

Furthermore, the main radio may: provide a second WUR-setup request intended for the electronic device, where the second WUR-setup request specifies one or more attributes associated with group-addressed frames that the recipient electronic device wants to receive using DMS; and receive a second wake-up frame associated with the electronic device, where the second wake-up frame indicates that the electronic device will subsequently provide a unicast copy of a second group-addressed frame having the one or more attributes.

Figure 4:
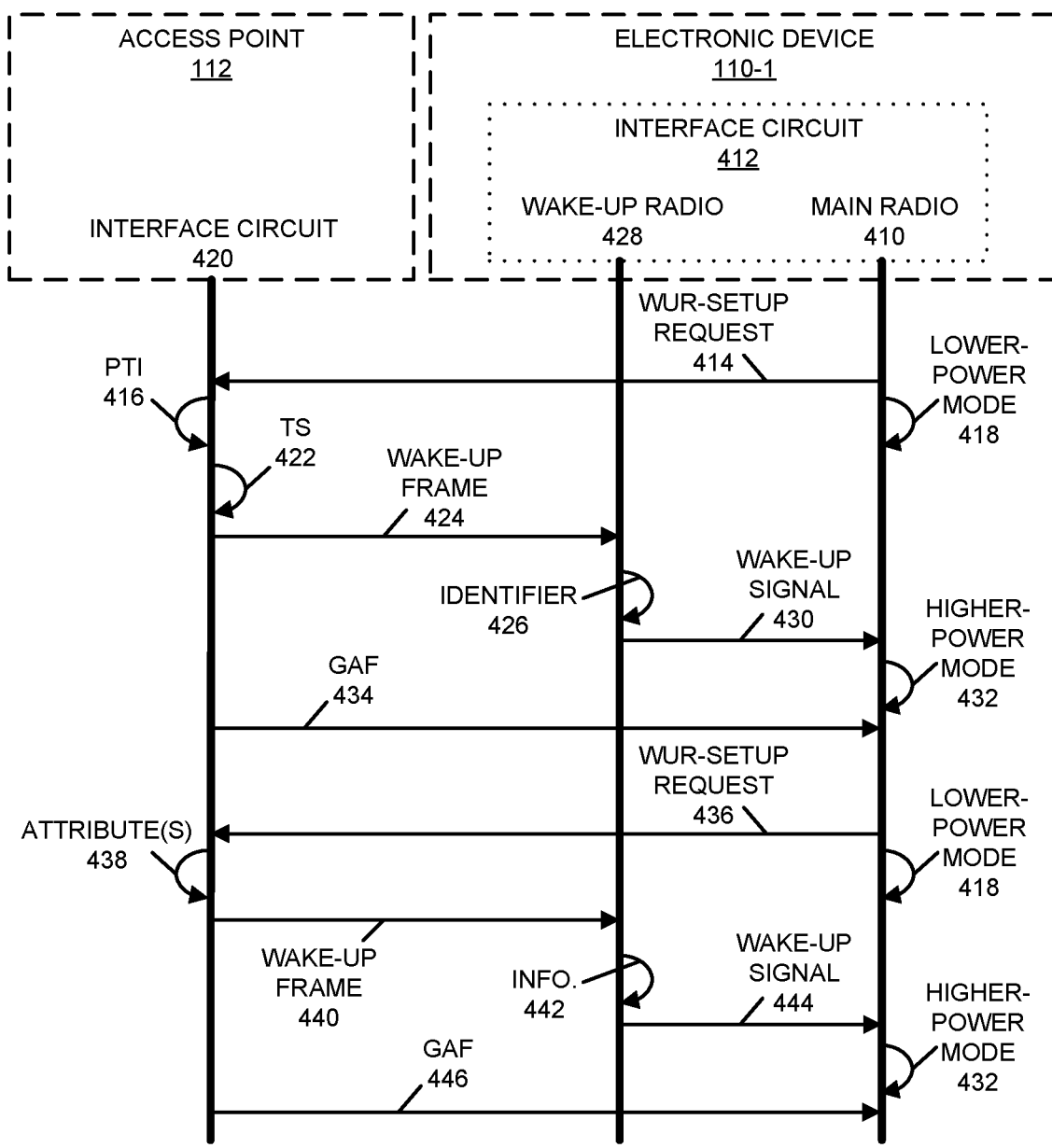
FIG. 4 is a flow diagram illustrating an example of communication between electronic devices, such as the electronic devices of FIG. 1.

The communication techniques are further illustrated in FIG. 4, which presents a flow diagram illustrating an example of communication between electronic device 110-1 and access point 112. After associating with access point 112, main radio 410 in interface circuit 412 in electronic device 110-1 may provide a WUR-setup request 414 to access point 112. This WUR-setup request may specify a group address for which electronic device 110-1 wants to receive associated frames and a proposed transmission interval (PTI) 416. Then, main radio 410 may transition to a lower-power mode 418.

After receiving WUR-setup request 414, interface circuit 420 may determine a transmission schedule (TS) 422 based at least in part on the proposed transmission interval 416. Then, interface circuit 420 may provide a wake-up frame 424 to electronic device 110-1, where the wake-up frame 424 includes an identifier 426 of an aggregated group that includes the group address for which a group-addressed frame will subsequently be transmitted by access point 112, and wake-up frame 424 is provided at a transmission time based at least in part on the transmission schedule 422. Note that interface circuit 420 may determine to provide wake-up frame 424 when there is downlink traffic (such as data associated with a service) that is associated with an aggregated group. Alternatively or additionally, interface circuit 420 may determine to provide wake-up frame 424 when there is an FMS stream for which there is pending traffic in access point 112, and wake-up frame 424 may specify the FMS stream.

After receiving wake-up frame 424, WUR 428 may extract and analyze identifier 426. Then, WUR 428 may perform a remedial action. For example, WUR 428 may provide, to main radio 410, a wake-up signal 430 that transitions main radio 410 from lower-power mode 418 to a higher-power mode 432 based at least in part on identifier 426. Subsequently, interface circuit 420 may provide the group-addressed frame (GAF) 434 to the aggregate group, including main radio 410 in electronic device 110-1.

In some embodiments, main radio 410 provides a WUR-setup request 436 to access point 112. This WUR-setup request may specify one or more attributes 438 associated with group-addressed frames that electronic device 110-1 wants to receive using DMS. Then, main radio 410 may transition to the lower-power mode 418.

After receiving WUR-setup request 436, interface circuit 420 may optionally determine to provide a wake-up frame 440 based at least in part on the one or more attributes 438.

For example, interface circuit 420 may determine to provide wake-up frame 440 when there is downlink traffic for at least electronic device 110-1 that has or that matches the one or more attributes 438. Then, interface circuit 420 may provide wake-up frame 440 for electronic device 110-1, where wake-up frame 440 indicates that access point 112 will subsequently provide a unicast copy of a group-addressed frame having the one or more attributes.

After receiving wake-up frame 440, WUR 428 may extract and information 442. Then, WUR 428 may perform a remedial action. For example, WUR 428 may provide, to main radio 410, a wake-up signal 444 that transitions main radio 410 from lower-power mode 418 to higher-power mode 432 based at least in part on information 442. Subsequently, interface circuit 420 may provide a unicast copy of the group-addressed frame 446 to at least electronic device 110-1 using DMS.

In some embodiments of the WUR technology, the communication techniques are used to determine, modify, and/or exchange information that specifies a transmission schedule and/or one or more attributes associated with group-addressed frames. This information may allow the number or frequency of wake-up frames to be reduced, and thus may reduce the power consumption of a recipient electronic device and the transmission overhead associated with the wake-up frames.

Notably, based at least in part on the transmission schedule and/or the one or more attributes, an electronic device (such as access point 112 in FIG. 1) may provide a wake-up frame to a recipient electronic device (such as electronic device 110-1 in FIG. 1). A WUR in the recipient electronic device may receive the wake-up frame. Moreover, based at least in part on the information included in the wake-up frame, the WUR may selectively transition a main radio (or other radio) in the recipient electronic device from a lower-power mode to a higher-power mode.

Figure 5:
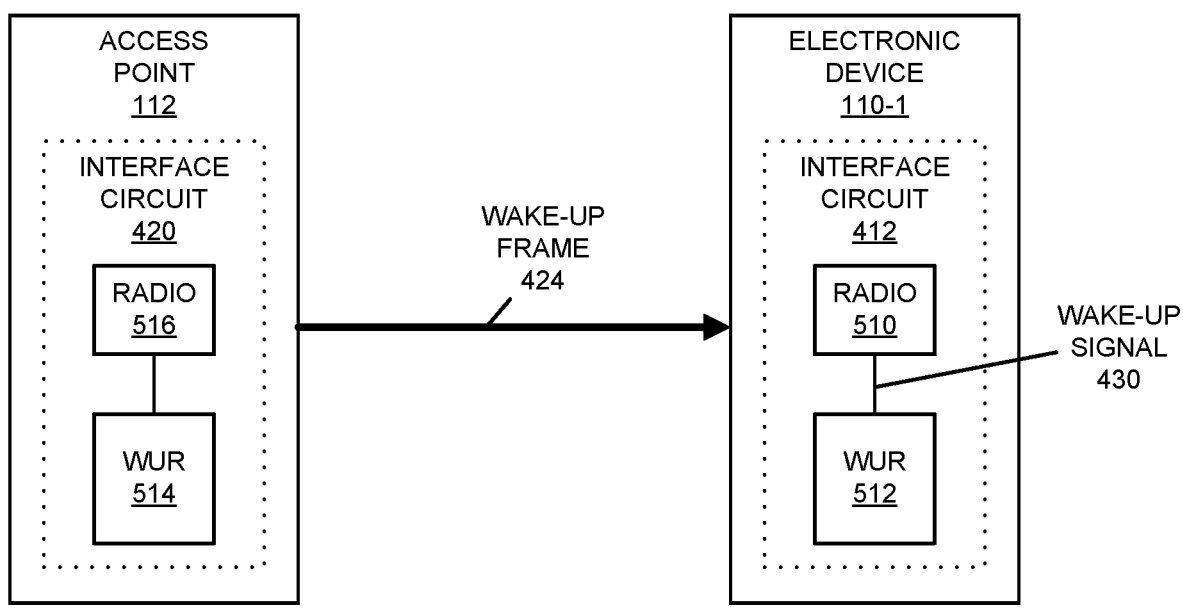
FIG. 5 is a drawing illustrating an example interface circuit in one of the electronic devices in FIG. 1.

As shown in FIG. 5, which presents a drawing illustrating an example of an interface circuit 412 in electronic device 110-1, a WUR 512 (such as WUR 428) may be a companion radio to a main (Wi-Fi) radio 510 (such as radio 114-1 or main radio 410) in interface circuit 412. WUR 512 may allow electronic device 110-1 to turn off main radio 510, e.g., whenever possible. Moreover, WUR 512 may wake up main radio 510 when wake-up frame 424, sent from optional WUR 514 or radio 516 (such as radio 114-2) in access point 112, specifies electronic device 110-1. Note that in some embodiments WUR 512 is configured to receive wireless signals, while main radio 510 is configured to transmit and to receive wireless signals. In these ways, the power consumption of WUR 512 may be very low, e.g., lower than Bluetooth Low Energy. In some other embodiments, WUR 512 may be configured to transmit and receive wireless signals, while still achieving a power savings. WUR 512 can operate in an always-on mode and/or in a duty-cycle mode. For example, in the duty-cycle mode, WUR 512 may turn on or listen for a wake-up frame from access point 112 based at least in part on a TWT schedule of electronic device 110-1.

Figure 6:
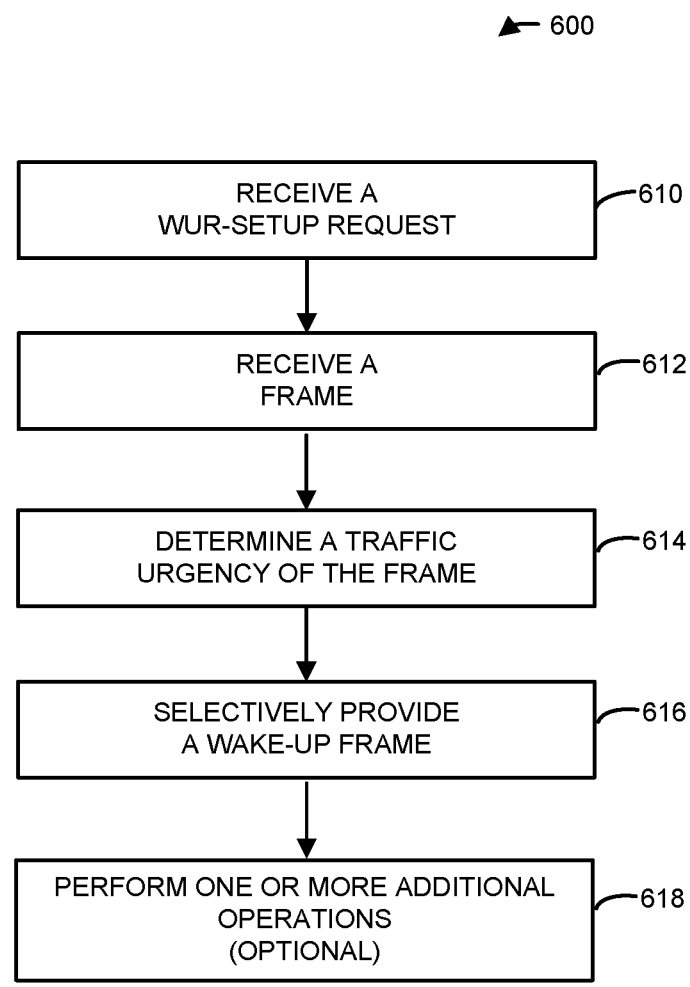
FIG. 6 is a flow diagram illustrating an example of a method for selectively providing a wake-up frame using one of the electronic devices in FIG. 1.

FIG. 6 presents a flow diagram illustrating an example method 600 for selectively providing a wake-up frame. This method may be performed by an electronic device, such as an interface circuit in access point 112 in FIG. 1. During operation, the interface circuit may receive a WUR-setup request (operation 610) associated with the recipient electronic device, where the WUR-setup request specifies one or more urgency criteria for downlink traffic from the electronic device for the recipient electronic device. Note that the one or more urgency criteria may include at least one of: an AC, an IP address, a UDP port, or a QoS.

Then, the interface circuit may receive a frame (operation 612) addressed to the recipient electronic device. Moreover, the interface circuit determines a traffic urgency of the frame (operation 614) based at least in part on the one or more urgency criteria.

Next, based at least in part on the determined traffic urgency, the interface circuit: may selectively provide the wake-up frame (operation 616) intended for the recipient electronic device, where the wake-up frame includes information specifying the traffic urgency of the frame. Alternatively, the interface circuit may selectively store the frame in a buffer.

In some embodiments, the interface circuit optionally performs one or more additional operations (operation 618). For example, the interface circuit may provide a second wake-up frame intended for the recipient electronic device at a subsequent retransmission time for the determined traffic urgency of the stored frame, where the second wake-up frame includes information specifying the traffic urgency of the frame.

Figure 7:
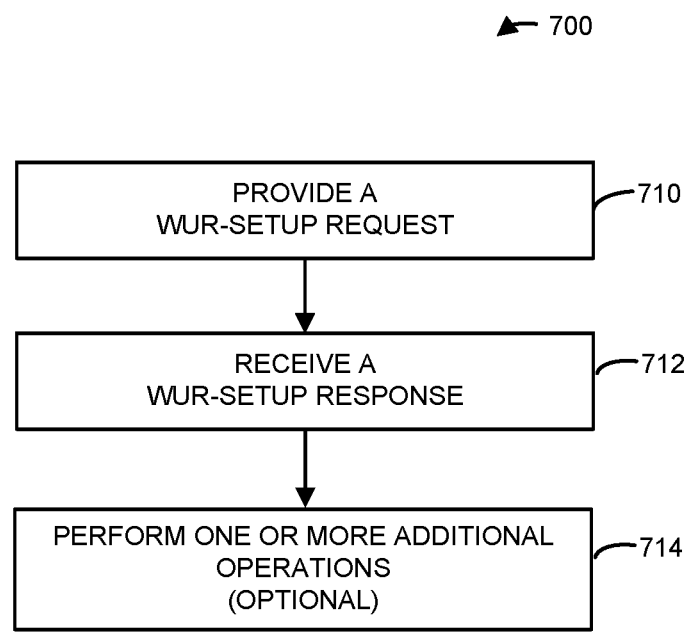
FIG. 7 is a flow diagram illustrating an example of a method for receiving a wake-up frame using one of the electronic devices in FIG. 1.

FIG. 7 presents a flow diagram illustrating an example method 700 for receiving a wake-up frame. This method may be performed by a recipient electronic device, such as an interface circuit in electronic device 110-1 in FIG. 1. This interface circuit may include a WUR and a main radio. During operation, the main radio in the recipient electronic device may provide a WUR-setup request (operation 710) intended for the electronic device, where the WUR-setup request specifies one or more urgency criteria for downlink traffic from the electronic device for the recipient electronic device. Note that the one or more urgency criteria may include at least one of: an AC, an IP address, a UDP port, or a QoS.

Then, the WUR in the recipient electronic device may receive the wake-up frame (operation 712) associated with the electronic device, where the wake-up frame includes information specifying a traffic urgency of a frame that the electronic device will transmit.

In some embodiments, the interface circuit optionally performs one or more additional operations (operation 714). For example, the WUR may selectively transition the main radio from a lower-power mode to a higher-power mode based at least in part on the information. Then, the main radio may receive the frame.

Moreover, the WUR may receive a second wake-up frame associated with the electronic device, where the second wake-up frame includes information specifying a traffic urgency of the frame.

Figure 8:
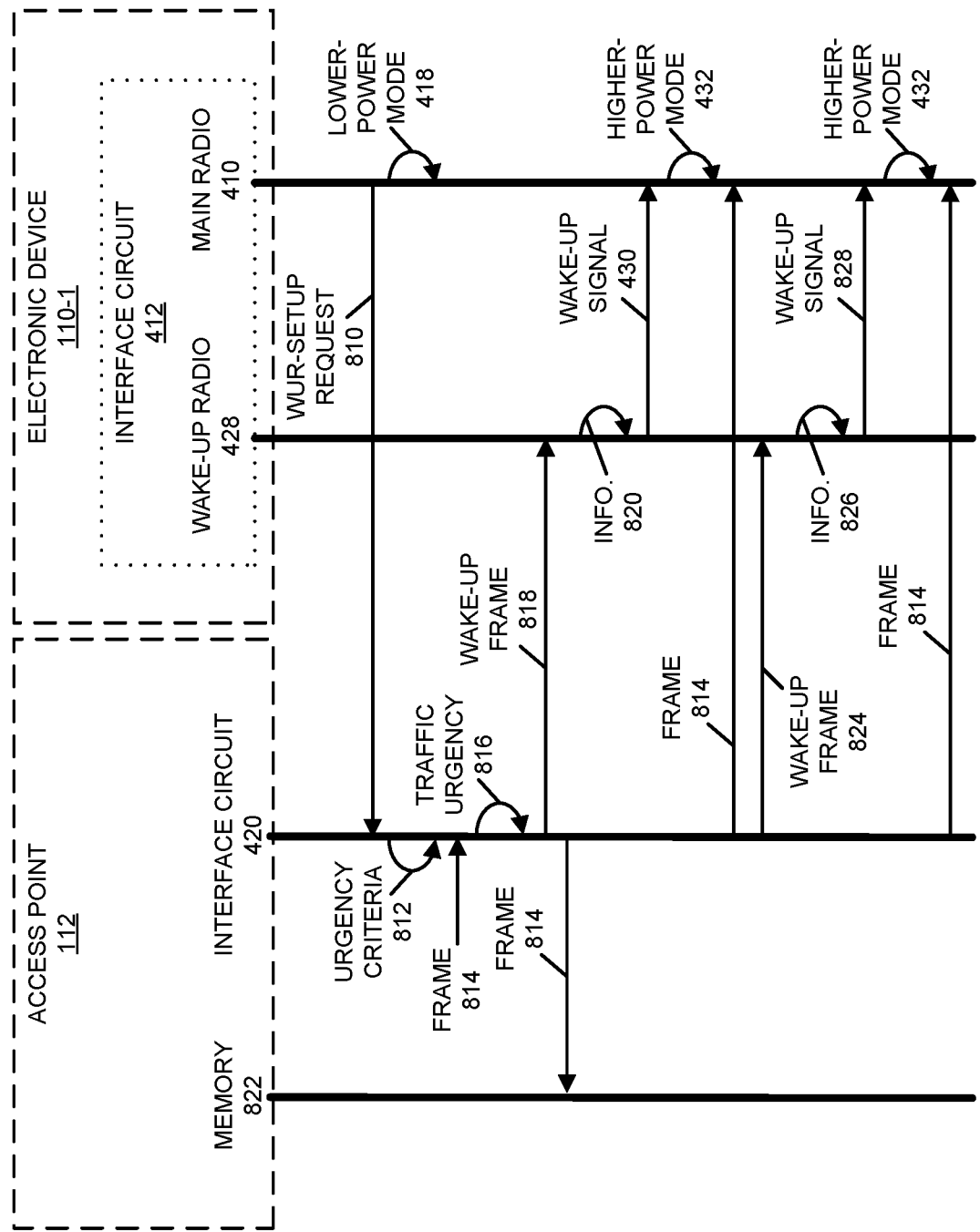
FIG. 8 is a flow diagram illustrating an example of communication between electronic devices, such as the electronic devices of FIG. 1.

The communication techniques are further illustrated in FIG. 8, which presents a flow diagram illustrating an example of communication between electronic device 110-1 and access point 112. After associating with access point 112, main radio 410 in interface circuit 412 in electronic device 110-1 may provide a WUR-setup request 810 to access point 112. This WUR-setup request may specify one or more urgency criteria 812 for downlink traffic from access point 112 for electronic device 110-1. Then, main radio 410 may transition to a lower-power mode 418.

After receiving WUR-setup request 414, interface circuit 420 may extract the one or more urgency criteria 812. Then, interface circuit 420 may receive a frame 814 addressed to electronic device 110-1. Moreover, interface circuit 420 may determines a traffic urgency 816 of frame 814 based at least in part on the one or more urgency criteria 812.

Next, based at least in part on the determined traffic urgency 816, interface circuit 420 may selectively provide a wake-up frame 818 to electronic device 110-1, where the wake-up frame includes information 820 specifying the traffic urgency 816 of frame 814. Alternatively, interface circuit 420 may selectively store frame 814 (or information associated with frame 814) in a buffer, such as memory 822.

After receiving wake-up frame 818, WUR 428 may extract and analyze information 820. Then, WUR 428 may perform a remedial action. For example, WUR 428 may provide, to main radio 410, a wake-up signal 430 that transitions main radio 410 from lower-power mode 418 to a higher-power mode 432 based at least in part on information 820. Subsequently, interface circuit 420 may provide frame 814 to electronic device 110-1.

Alternatively, interface circuit 420 may provide a wake-up frame 824 to electronic device 110-1 at a subsequent retransmission time for the determined traffic urgency 816 of the stored frame 814, where wake-up frame 824 includes information 826 specifying the traffic urgency 816 of frame 814.

After receiving wake-up frame 824, WUR 428 may extract and analyze information 826. Then, WUR 428 may perform a remedial action. For example, WUR 428 may provide, to main radio 410, a wake-up signal 828 that transitions main radio 410 from lower-power mode 418 to a higher-power mode 432 based at least in part on information 826. Subsequently, interface circuit 420 may provide frame 814 to electronic device 110-1.

While communication between the components in FIG. 4 and/or FIG. 8 are illustrated with unilateral or bilateral communication (e.g., lines having a single arrow or dual arrows), in general a given communication operation may be unilateral or bilateral.

In some embodiments of methods 200 (FIG. 2), 300 (FIG. 3), 600 (FIG. 6) and/or 700, there may be additional or fewer operations. Moreover, the order of the operations may be changed, and/or two or more operations may be combined into a single operation or performed at least partially in parallel.

In some embodiments, at least some of the operations in methods 200 (FIG. 2), 300 (FIG. 3), 600 (FIG. 6) and/or 700 are performed by an interface circuit in the electronic device. For example, at least some of the operations may be performed by firmware executed by an interface circuit, such as firmware associated with a media access control (MAC) layer, as well as one or more circuits in a physical layer in the interface circuit.

In some embodiments of the communication techniques, DMS and/or FMS, which are specified in IEEE 802.11v, may be used to indicate, in advance, when an access point is going to transmit a group-addressed frame that a recipient electronic device (which is sometimes referred to as a 'station' or a 'STA') wants to receive. In response, a WUR in the recipient electronic device can selectively wake up the main radio, thereby reducing the power consumption of the recipient electronic device. In addition, DMS and/or FMS may be used to convey information that allows the recipient electronic device to receive a desired group-addressed frame in a reduced (or even minimum) time duration.

As noted previously, DMS is specified in IEEE 802.11v. An access point may use DMS to transmit a copy of a group-addressed or multicast frame to an individual address of a recipient electronic device (such as a media access control or MAC address). This may ensure that the recipient electronic device receives the multicast addressed frame. Notably, instead of waking up the main radio after each DTIM beam, a recipient electronic device may wake up the main radio in response to a wake-up frame that indicates that the access point will be transmitting a unicast copy of a group-addressed frame to the recipient electronic device. Moreover, in DMS, the recipient electronic device may configure or specify the group-addressed frames it desires to receive as a unicast-addressed copy, e.g., using a traffic classification (TCLAS) element during DMS-setup signaling. For example, a TCLAS element may specify one or more of: an AC, a QoS priority level, one or more IEEE 802.11 MAC header parameters, one or more IEEE 802.1Q parameters, an IP address, a TCP/UDP port, etc. Thus, using DMS, the recipient electronic device may be selective and may request to receive group-addressed frames from source addresses that are of interest.

In some embodiments, a WUR-capable access point may support DMS. The DMS-configuration signaling may be performed at the same time as the WUR-setup signaling. This approach may reduce delays and overhead. Recipient electronic devices may rely on the ability of an access point to support DMS and that the service is available. DMS may be used with a WUR, without requiring modifications to DMS or the WUR. Note that wake-up frames may indicate that there are buffered unicast frames. DMS-specific unicast copies of multicast frames may be handled as any other unicast frame.

Moreover, DMS can improve the performance of the recipient electronic device. For example, the transmission rate may be enhanced or optimized for a particular recipient electronic device. The recipient electronic device may receive other unicast traffic at the same time. The recipient electronic device can be very selective and may request unicast copies to be transmitted from one or more specific multicast addresses. However, by adding copies of the multicast traffic, DMS adds to the amount of transmitted traffic. In a high-density communication environment, an access point may not have sufficient transmission capacity to operate with DMS.

Furthermore, FMS is specified by IEEE 802.11v. FMS allows an access point to group multicast addresses to FMS streams. An access point may use a DTIM beacon to indicate the FMS streams for which it will transmit traffic immediately after the DTIM beacon, so that recipient electronic devices know which group-addressed frames will be transmitted. There may be up to, e.g., 256 FMS streams. Traffic from an FMS may have a transmission interval of multiple DTIM Beacon intervals. Consequently, recipient electronic devices can sleep longer and wake up for a DTIM beacon that indicates there is traffic that the recipient electronic devices want to receive. Note that there may be up to, e.g., 8 transmission intervals.

Thus, FMS may be used to organize specific multicast and broadcast addresses for which frames will be transmitted at multiple DTIM beacon intervals. A recipient electronic device may, therefore, selectively wake up the main radio in response to specific DTIM beacons. In this way, the recipient electronic device can more precisely receive the traffic in which it is interested and can wake up between multiple DTIM beacon intervals. Thus, there may be different transmission intervals for different sources. An access point can use FMS to indicate in the DTIM beacon the FMS streams for which it has buffered traffic and that will be transmitted immediately after the DTIM beacon. This enables FMS-capable recipient electronic devices to more determine whether they will receive group addressed-frames after the DTIM beacon.

Note that FMS is backward compatible, so that multiple recipient electronic devices can receive the same copy of the group-addressed frames. Note that FMS is suitable for use in high-density communication environments because it does not add additional copies of the group-addressed frames into the transmissions.

Additionally, FMS streams may be reused in wake-up frames. Notably, the wake-up frames may indicate the group addresses from which the access point will transmit frames in next DTIM beacon. This allows recipient electronic devices in a lower-power mode to receive frames from specific group addresses. Otherwise, a recipient electronic device in a lower-power mode may skip the reception of all group-addressed frames or may receive all group-addressed frames. Because FMS is already specified and it improves the power efficiency of legacy electronic devices, it can be used in conjunction with WURs.

In some embodiments, FMS has a setup signaling. Notably, a recipient electronic device may transmit an FMS request frame to propose a group address and a transmission interval for an FMS stream. The access point may select the transmission intervals and the group addresses of the FMS streams, and may signal this information in FMS response or a (re)association response frame. Note that beacons may contain an FMS descriptor element that indicates the schedule of the FMS streams. An FMS descriptor element in a DTIM beacon may also indicate the FMS streams for which a frame will be transmitted immediately after the DTIM beacon.

Thus, a recipient electronic device may propose that frames from specific group addresses will be transmitted between fixed DTIM intervals. The FMS requests may identify the multicast traffic that recipient electronic devices are interested to receive and may propose a specific transmission interval for the traffic. Then, the access point may decide to group the multicast or group address to a specific FMS stream, may select the schedule for its transmission, and may transmit the group-addressed frames according to the schedule. The access point may indicate in a DTIM beacon that it has buffered traffic that will be transmitted immediately after the DTIM beacon for each FMS stream. Note that there may be, e.g., 256 FMS streams available. The access point can assign the multicast addresses into an FMS group and the DTIM intervals between the group-addressed-frames transmission. Moreover, the access point may intelligently group or assign the multicast addresses into an FMS group in a set of FMS groups, e.g., there may be eight FMS transmission schedules available.

In embodiments of the communication techniques, DMS and/or FMS may be used to reduce the power consumption of a recipient electronic device. Notably, FMS may be used to specify up to, e.g., eight schedules to transmit group-addressed frames. A wake-up frame may indicate group-addressed-frames transmission, including indicating from which FMSID the access point will transmit group-addressed frames. A recipient electronic device can use the indication of the traffic transmission from a FMS group to decide whether it activates the main radio.

In some embodiments, the access point may use FMS streams in a wake-up frame to signal the multicast and group addresses from which it will send data. The access point may signal in a (re-) association response, an FMS setup response or in probe response frames which FMS streams are indicated in the wake-up frame. For example, these messages may contain a list of FMS streams that are present in the wake-up frame and the wake-up frame may have a bitfield where each bit indicates an FMS stream in the listed order. Moreover, a wake-up frame may have a bitfield with a length of, e.g., 16 bits, and a bit may be set to, e.g., '1' if the access point will transmit one or more frames that are classified or assigned to a corresponding FMS stream.

Moreover, the access point may select the FMS streams that are presented in the wake-up frame. For example, the access point may consider the capability of a recipient electronic device to operate in a WUR mode (such as a lower-power mode), a number of recipient electronic devices that have indicated a desire to receive group-addressed frames belonging to the same FMS stream, and/or characteristics of the transmission periodicity of the group-addressed frames. Note that, if a frame belonging to an FMS stream is transmitted deterministically, or very often, the access point may not indicate the transmission of the frame belonging to this FMS stream in a wake-up frame.

In these ways, the communication techniques may reduce the number of main-radio activations and, thus, the power consumption of the recipient electronic device. Thus, using the communication techniques, a recipient electronic device with a WUR can more precisely receive the group-addressed frames that are of interest.

In some embodiments, the size of a wake-up frame may be limited. Notably, a wake-up frame may have room for, e.g., a few octets to indicate buffered group-addressed frames. If an access point has many FMS streams, the access point may select FMS streams that are indicated in a wake-Up frame. The wake-up frame may contain a bitfield where each bit is assigned to a selected FMS Stream. A bit may indicate whether the access point will transmit traffic from the FMS stream. For example, a value of '1' may indicate that the access point will transmit traffic from the FMS stream, and a value of '0' may indicate that AP will not transmit traffic from the FMS stream.

Furthermore, signaling may be used to reuse FMS in wake-up frames. Notably, an WUR-compatible access point may list which FMS stream a bit in an FMS-streams bitfield represents. The AP may list the FMS streams in the order they are listed in the bitfield of the wake-up frame. This information may be provided by WUR-setup signaling, (re-) association and/or FMS setup frames.

Additionally, there may be an approach for notifying a recipient electronic device of a change in the FMS information. Notably, an access point may notify the recipient electronic device(s) in a lower-power mode when the FMS-stream mapping in a wake-up frame changes, e.g., a bit in wakeup-frame bitfield that no longer represents the same group address. This notification may indicate that an FMS stream is no longer mapped to a wake-up frame and/or that the group address of the FMS stream has changed. Moreover, there may be an indication when a wake-up frame indicates whether an access point transmits frames from a new FMS stream.

In some embodiments, the wake-up frame may contain, e.g., a two-bit length counter that is increased by one when an FMS-stream mapping changes. If a recipient electronic device detects a changed value in the counter, the recipient electronic device may receive a DTIM beacon or a probe response in order to obtain the current FMS settings. Alternatively, a check-beacon counter may be increased by, e.g., one when any operating parameter or FMS-stream mapping changes.

Thus, wake-up-frame signaling can be used to indicate changes in the FMS information. For example, a wake-up frame may contain a counter (such as a counter with a two-bit length) that is increased by one when the FMS information is changed, such as when a classification criteria changes or when an FMSID is created or deleted. If a recipient electronic device detects a change in the value of the counter, the recipient electronic device may receive a DTIM beacon or may use a probe request/probe response (i.e., unicast communication with the access point) to obtain the current FMS settings. Alternatively, the FMS information can use this indicator to indicate if any operating parameter has changed. Note that the wake-up frame length can be optimized.

Moreover, there may be several benefits of FMS. Notably, selective reception of group-addressed frames may be needed for recipient electronic devices in a lower-power mode. Otherwise, the recipient electronic devices in the lower-power mode may receive all or no group-addressed frames. Note that FMS stream indications in a DTIM beacon may reduce the power consumption of FMS-capable recipient electronic devices. These recipient electronic devices may skip reception of group-addressed frames for which they are not interested. Furthermore, the FMS-compatible recipient electronic devices may wake up more selectively to receive the group-addressed frames they are interested in receiving. Note that FMS is suitable for high-density deployments, because FMS does not transmit multiple copies of group-addressed frames.

In summary, a WUR-compatible access point may implement DMS and/or FMS to allow recipient electronic devices with WURs to selectively receive frames from specific group addresses. DMS may enable such a recipient electronic device to receive a unicast copy from the specific group addresses. The wake-up frame may indicate the FMS streams from which the access point will transmit frames. DMS and FMS are backward compatible and may also reduce the power consumption of recipient electronic devices that do not include a WUR. Therefore, the communication techniques may not require any changes to the FMS or DMS definitions in IEEE 802.11v.

Thus, an access point may implement DMS and/or FMS features in order to reduce the power consumption of a legacy electronic device or a recipient electronic device that includes a WUR. The wake-up frame for buffered group-addressed frames may indicate the FMSIDs of the group-addressed frames that the access point will transmit. Moreover, DMS may enable a recipient electronic device with a WUR to receive traffic from specific group addressed in a very power-efficient manner.

In some embodiments, the communication techniques facilitate improved power efficiency when receiving individually addressed frames. Notably, an access point may typically wake up a recipient electronic device with a WUR from a lower-power mode every time the access point obtains an individually addressed frame for the recipient electronic device.

Moreover, a recipient electronic device may configure an immediate or power-enhanced wake up of the main radio in a recipient electronic device based at least in part on address information of the downlink frames. This power-enhanced wake up may reduce the number of main-radio activations and the access point may buffer larger amounts of traffic to be transmitted per main-radio activation. Note that the transmission delay of immediate wake-up frames may be shorter than the delay for other traffic because the access point 'understands' or has situational awareness of the urgency of the wake-up frame. For example, the urgency may be determined by an access point based at least in part on any/all of: an IP address, a TCP/UDP port, an AC, a QoS of the traffic, etc.

Furthermore, there may be different delay requirements for different downlink frames. For example, some keep-alive messages, emails and/or other updates may not have strict delay requirements. Typical access-point power-saving techniques have been tailored to infrequent wake ups and to deliver all messages in a single activation round. The WUR has a small standby power consumption, which enables a battery-powered recipient electronic device to receive traffic more often using the WUR. The increased recipient electronic-device availability can shorten the wake-up frame transmission delays. However, the power-consumption benefit of the WUR may be reduced if the main radio is activated very frequently, or if the main-radio transmissions have high overhead.

Additionally, the urgency criterion or criteria of the downlink frames can be configured using setup signaling. Notably, a recipient electronic device may configure whether the downlink frame is urgent and that a recipient electronic device in a lower-power mode should activate the main radio quickly (e.g., immediately or urgently), or that non-urgent and power-enhanced main-radio activation is desired (e.g., for efficient use of power). The urgency of the downlink frame may be configured of defined during WUR-setup signaling, which may be transmitted by the main radio to the access point. For example, a recipient electronic device may use one or more TCLAS elements in a WUR-setup request to classify one or more specific downlink-frame addresses as urgent or non-urgent. Then, an access point may decide or may determine an urgency classification for these frames and may signal the applied classification rule in a WUR-setup response.

Note that the access point may signal an urgency of a wake-up frame. For example, a wake-up frame may include a bit that indicates whether the access point requires immediate or power-enhanced wake-up. For a value of, e.g., '1', the recipient electronic device may wake-up immediately to receive one or more urgent frames. Alternatively, for a value of, e.g., '0', the recipient electronic device may select the time when it wakes to receive one or more non-urgent frames. The time may be selected such that the main radio operates in a more power-efficient manner. Note that these numerical values are for purposes of illustration and other numerical values or coding may be used. Thus, in some embodiments, the presence or absence of a bit can be used to specify the urgency of a frame. Note that the total length of a wake-up frame may be, e.g., 40-50 bits, and the length may be specified in the wake-up frame.

In some embodiments, a recipient electronic device receives non-urgent frames: when it receives urgent frames; when it receives group-addressed frames; after a delay (which may allow more frames to be transmitted at a time); or immediately in the same way as urgent frames.

During transmission of wake-up frames, an access point may prioritize the transmission of a wake-up frame that indicates immediate wake-up. An access point may use control logic to subsequently retransmit a wake-up frame that indicates power-optimized wake-up. For example, an access point may retransmit a wake-up frame indicating power optimized wake up with a longer retransmission delay than a wake-up frame indicating immediate wakeup. Thus, the access point may select the frequency of retransmission of a low-priority frame. In some embodiments, a low-priority frame has a transmission delay between, e.g., tens of milliseconds and several seconds. Alternatively, an access point may transmit a wake-up frame that indicates immediate wake-up to ensure that a recipient electronic device is available. In some embodiments, an access point sends a wake-up frame each time there is a frame addressed to a recipient electronic device, and the recipient electronic device determines whether to wake up or not in response to a wake-up frame, e.g., the recipient electronic device may selectively wake up to receive a particular frame based at least in part on an urgency determined by the access point and/or the recipient electronic device.

Therefore, in some embodiments the second communication techniques may be used to enable a recipient electronic device to classify downlink frames as urgent or non-urgent. The classification may reduce the power consumption of the recipient electronic device by reducing the number of main-radio activations and, thus, the amount of time the recipient electronic device operates in the higher-power state. Note that, in some embodiments, a bit in an individually addressed wake-up frame may indicate whether a wake up is immediate or power optimized.

We now describe embodiments of an electronic device. FIG. 9 presents a block diagram of an electronic device 900 (which may be a cellular telephone, an access point, another electronic device, etc.) in accordance with some embodiments. This electronic device includes processing subsystem 910, memory subsystem 912, and networking subsystem 914. Processing subsystem 910 includes one or more devices configured to perform computational operations. For example, processing subsystem 910 can include one or more microprocessors, application-specific integrated circuits (ASICs), microcontrollers, graphics processing units (GPUs), programmable-logic devices, and/or one or more digital signal processors (DSPs).

Memory subsystem 912 includes one or more devices for storing data and/or instructions for processing subsystem 910 and networking subsystem 914. For example, memory subsystem 912 can include dynamic random access memory (DRAM), static random access memory (SRAM), a read-only memory (ROM), flash memory, and/or other types of memory. In some embodiments, instructions for processing subsystem 910 in memory subsystem 912 include: program instructions or sets of instructions (such as program instructions 922 or operating system 924), which may be executed by processing subsystem 910. For example, a ROM can store programs, utilities or processes to be executed in a non-volatile manner, and DRAM can provide volatile data storage, and may store instructions related to the operation of electronic device 900. Note that the one or more computer programs may constitute a computer-program mechanism, a computer-readable storage medium or software. Moreover, instructions in the various modules in memory subsystem 912 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 910. In some embodiments, the one or more computer programs are distributed over a network-coupled computer system so that the one or more computer programs are stored and executed in a distributed manner.

In addition, memory subsystem 912 can include mechanisms for controlling access to the memory. In some embodiments, memory subsystem 912 includes a memory hierarchy that comprises one or more caches coupled to a memory in electronic device 900. In some of these embodiments, one or more of the caches is located in processing subsystem 910.

In some embodiments, memory subsystem 912 is coupled to one or more high-capacity mass-storage devices (not shown). For example, memory subsystem 912 can be coupled to a magnetic or optical drive, a solid-state drive, or another type of mass-storage device. In these embodiments, memory subsystem 912 can be used by electronic device 900 as fast-access storage for often-used data, while the mass-storage device is used to store less frequently used data.

Figure 9:
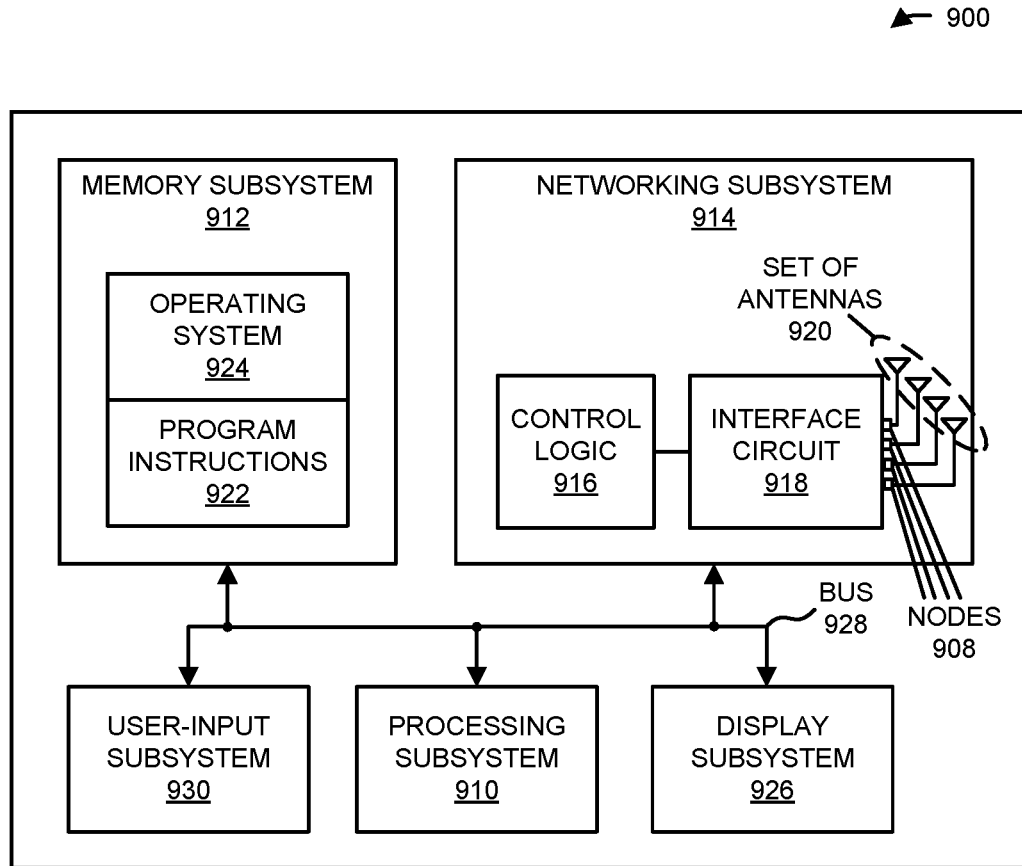
FIG. 9 is a block diagram illustrating an example of one of the electronic devices of FIG. 1.

Networking subsystem 914 includes one or more devices configured to couple to and communicate on a wired and/or wireless network (i.e., to perform network operations), including: control logic 916, an interface circuit 918 and a set of antennas 920 (or antenna elements) in an adaptive array that can be selectively turned on and/or off by control logic 916 to create a variety of optional antenna patterns or 'beam patterns.' (While FIG. 9 includes set of antennas 920, in some embodiments electronic device 900 includes one or more nodes, such as nodes 908, e.g., a pad, which can be coupled to set of antennas 920. Thus, electronic device 900 may or may not include set of antennas 920.) For example, networking subsystem 914 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

In some embodiments, networking subsystem 914 includes one or more radios, such as a WUR that is used to receive wake-up frames, and a main radio that is used to transmit and/or receive frames or packets during a higher-power mode. The WUR and the main radio may be implemented separately (such as using discrete components or separate integrated circuits) or in a common integrated circuit.

Networking subsystem 914 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 900 may use the mechanisms in networking subsystem 914 for performing simple wireless communication between the electronic devices, e.g., transmitting advertising or frame frames and/or scanning for advertising frames transmitted by other electronic devices.

Within electronic device 900, processing subsystem 910, memory subsystem 912, and networking subsystem 914 are coupled together using bus 928 that facilitates data transfer between these components. Bus 928 may include an electrical, optical, and/or electro-optical connection that the subsystems can use to communicate commands and data among one another. Although only one bus 928 is shown for clarity, different embodiments can include a different number or configuration of electrical, optical, and/or electro-optical connections among the subsystems.

In some embodiments, electronic device 900 includes a display subsystem 926 for displaying information on a display, which may include a display driver and the display, such as a liquid-crystal display, a multi-touch touchscreen, etc. Display subsystem 926 may be controlled by processing subsystem 910 to display information to a user (e.g., information relating to incoming, outgoing, or an active communication session).

Electronic device 900 can also include a user-input subsystem 930 that allows a user of the electronic device 900 to interact with electronic device 900. For example, user-input subsystem 930 can take a variety of forms, such as: a button, keypad, dial, touch screen, audio input interface, visual/image capture input interface, input in the form of sensor data, etc.

Electronic device 900 can be (or can be included in) any electronic device with at least one network interface. For example, electronic device 900 may include: a cellular telephone or a smartphone, a tablet computer, a laptop computer, a notebook computer, a personal or desktop computer, a netbook computer, a media player device, an electronic book device, a MiFi® device, a smartwatch, a wearable computing device, a portable computing device, a consumer-electronic device, an access point, a router, a switch, communication equipment, test equipment, as well as any other type of electronic computing device having wireless communication capability that can include communication via one or more wireless communication protocols.

Although specific components are used to describe electronic device 900, in alternative embodiments, different components and/or subsystems may be present in electronic device 900. For example, electronic device 900 may include one or more additional processing subsystems, memory subsystems, networking subsystems, and/or display subsystems. Additionally, one or more of the subsystems may not be present in electronic device 900. Moreover, in some embodiments, electronic device 900 may include one or more additional subsystems that are not shown in FIG. 9. Also, although separate subsystems are shown in FIG. 9, in some embodiments some or all of a given subsystem or component can be integrated into one or more of the other subsystems or component(s) in electronic device 900. For example, in some embodiments program instructions 922 are included in operating system 924 and/or control logic 916 is included in interface circuit 918.

Moreover, the circuits and components in electronic device 900 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 914. This integrated circuit may include hardware and/or software mechanisms that are used for transmitting wireless signals from electronic device 900 and receiving signals at electronic device 900 from other electronic devices. Aside from the mechanisms herein described, radios are generally known in the art and hence are not described in detail. In general, networking subsystem 914 and/or the integrated circuit can include any number of radios. Note that the radios in multiple-radio embodiments function in a similar way to the described single-radio embodiments.

In some embodiments, networking subsystem 914 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals).

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 922, operating system 924 (such as a driver for interface circuit 918) or in firmware in interface circuit 918. Alternatively or additionally, at least some of the operations in the communication techniques may be implemented in a physical layer, such as hardware in interface circuit 918. In some embodiments, the communication techniques are implemented, at least in part, in a MAC layer and/or in a physical layer in interface circuit 918.

While examples of numerical values are provided in the preceding discussion, in other embodiments different numerical values are used. Consequently, the numerical values provided are not intended to be limiting.

While the preceding embodiments illustrated the use of a WUR-setup request and a wake-up frame that are communicated using Wi-Fi, in other embodiments of the communication techniques Bluetooth Low Energy is used to communicate one or more of these frames or packets. Furthermore, the WUR-setup request and/or the wake-up frame may be communicated in the same or a different band of frequencies that the band(s) of frequencies used by the main radio. For example, the WUR-setup request and/or the wake-up frame may be communicated in one or more bands of frequencies, including: 900 MHz, 2.4 GHz, 5 GHz, 60 GHz, and/or a band of frequencies used by LTE.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   a node configured to communicatively couple to an antenna; and
   an interface circuit, communicatively coupled to the node, configured to communicate with a recipient electronic device, and configured to:
      receive, from the node, a wake-up radio (WUR)-setup request associated with the recipient electronic device, wherein the WUR-setup request specifies a group address for which the recipient electronic device wants to receive associated frames and a proposed transmission interval;
      determine a transmission schedule based at least in part on the proposed transmission interval; and
      provide, to the node, a wake-up frame intended for the recipient electronic device, wherein the wake-up frame comprises an identifier of an aggregated group, the identifier comprising the group address for which a group-addressed frame will subsequently be transmitted by the electronic device,
      wherein the wake-up frame is provided at a transmission time based at least in part on the transmission schedule, and
      wherein the electronic device comprises an access point and the recipient electronic device comprises a client or a station that is associated with the access point.

2. The electronic device of claim 1, wherein the transmission time is an integer multiple of a Delivery Traffic Indication Message (DTIM)-beacon transmission interval.

3. The electronic device of claim 1, wherein the group address is included in one or more group addresses associated with one or more Flexible Multicast Service (FMS) streams that are provided by the electronic device.

4. The electronic device of claim 1, wherein the identifier comprises a flexible multicast service identifier (FMSID).

5. The electronic device of claim 1, wherein the wake-up frame specifies a Flexible Multicast Service (FMS) stream for which there is pending traffic in the electronic device.

6. The electronic device of claim 1, wherein the interface circuit is configured to select a Flexible Multicast Service (FMS) stream for which there is pending traffic in the electronic device; and
   wherein the wake-up frame specifies the FMS stream.

7. The electronic device of claim 1, wherein the interface circuit is configured to assign, based at least in part on the group address, the recipient electronic device to the aggregated group associated with a flexible multicast service identifier (FMSID).

8. The electronic device of claim 1, wherein the WUR-setup request and the wake-up frame are compatible with an IEEE 802.11 communication protocol.

9. The electronic device of claim 1, wherein the interface circuit is configured to:
   receive, from the node, a second WUR-setup request associated with the recipient electronic device, wherein the second WUR-setup request specifies one or more attributes associated with group-addressed frames that the recipient electronic device wants to receive using a directed multicast service (DMS); and
   provide, to the node, a second wake-up frame intended for the recipient electronic device, wherein the second wake-up frame indicates that the electronic device will subsequently provide a unicast copy of a second group-addressed frame having the one or more attributes.

10. A non-transitory computer-readable storage medium for use in conjunction with an electronic device, the computer-readable storage medium storing program instructions that, when executed by the electronic device, cause the electronic device to provide a wake-up frame by carrying out one or more operations comprising:
    receiving, at an interface circuit in the electronic device, a wake-up radio (WUR)-setup request associated with a recipient electronic device, wherein the WUR-setup request specifies a group address for which the recipient electronic device wants to receive associated frames and a proposed transmission interval;
    determining a transmission schedule based at least in part on the proposed transmission interval; and
    providing, from the interface circuit, the wake-up frame intended for the recipient electronic device, wherein the wake-up frame comprises an identifier of an aggregated group, the identifier comprising the group address for which a group-addressed frame will subsequently be transmitted by the electronic device,
    wherein the wake-up frame is provided at a transmission time based at least in part on the transmission schedule, and
    wherein the electronic device comprises an access point and the recipient electronic device comprises a client or a station that is associated with the access point.

11. The non-transitory computer-readable storage medium of claim 10, wherein the transmission time is an integer multiple of a Delivery Traffic Indication Message (DTIM)-beacon transmission interval.

12. The non-transitory computer-readable storage medium of claim 10, wherein the group address is included in one or more group addresses associated with one or more Flexible Multicast Service (FMS) streams that are provided by the electronic device.

13. The non-transitory computer-readable storage medium of claim 10, wherein the identifier comprises a flexible multicast service identifier (FMSID).

14. The non-transitory computer-readable storage medium of claim 10, wherein the wake-up frame specifies a Flexible Multicast Service (FMS) stream for which there is pending traffic in the electronic device.

15. The non-transitory computer-readable storage medium of claim 10, wherein the operations comprise selecting a Flexible Multicast Service (FMS) stream for which there is pending traffic in the electronic device; and
    wherein the wake-up frame specifies the FMS stream.

16. The non-transitory computer-readable storage medium of claim 10, wherein the the operations comprise assigning, based at least in part on the group address, the recipient electronic device to the aggregated group associated with a flexible multicast service identifier (FMSID).

17. A method for providing a wake-up frame, comprising:
by an electronic device:
receiving, at an interface circuit in the electronic device, a wake-up radio (WUR)-setup request associated with a recipient electronic device, wherein the WUR-setup request specifies a group address for which the recipient electronic device wants to receive associated frames and a proposed transmission interval;
determining a transmission schedule based at least in part on the proposed transmission interval; and
providing, from the interface circuit, the wake-up frame intended for the recipient electronic device, wherein the wake-up frame comprises an identifier of an aggregated group, the identifier comprising the group address for which a group-addressed frame will subsequently be transmitted by the electronic device,
wherein the wake-up frame is provided at a transmission time based at least in part on the transmission schedule, and
wherein the electronic device comprises an access point and the recipient electronic device comprises a client or a station that is associated with the access point.

18. The method of claim 17, wherein the transmission time is an integer multiple of a Delivery Traffic Indication Message (DTIM)-beacon transmission interval and the integer is greater than one.

19. The method of claim 17, wherein the identifier comprises a flexible multicast service identifier (FMSID).

20. The method of claim 17, wherein the wake-up frame specifies a Flexible Multicast Service (FMS) stream for which there is pending traffic in the electronic device.

* * * * *